United States Patent
Ehlert et al.

(10) Patent No.: US 8,398,310 B2
(45) Date of Patent: Mar. 19, 2013

(54) SELF ALIGNING BEARING AND SEAL ASSEMBLY

(75) Inventors: Charles Wayne Ehlert, Houston, TX (US); Patrick Wilson Duncan, Marshville, NC (US)

(73) Assignee: Total Lubrication Management Company, Fulton, MD (US)

( * ) Notice: Subject to any disclaimer, the term of this patent is extended or adjusted under 35 U.S.C. 154(b) by 682 days.

(21) Appl. No.: 12/452,133

(22) PCT Filed: Sep. 22, 2008

(86) PCT No.: PCT/US2008/077156
§ 371 (c)(1),
(2), (4) Date: Dec. 16, 2009

(87) PCT Pub. No.: WO2009/131594
PCT Pub. Date: Oct. 29, 2009

(65) Prior Publication Data
US 2010/0135606 A1    Jun. 3, 2010

Related U.S. Application Data

(60) Provisional application No. 61/046,549, filed on Apr. 21, 2008.

(51) Int. Cl.
*F16C 23/08* (2006.01)
*F16C 23/04* (2006.01)

(52) U.S. Cl. ........ 384/495; 384/477; 384/492; 384/498; 384/558

(58) Field of Classification Search .................. 384/192, 384/203, 206, 213, 154, 474–475, 477, 495, 384/498, 536, 492, 558
See application file for complete search history.

(56) References Cited

U.S. PATENT DOCUMENTS

| | | | |
|---|---|---|---|
| 2,452,352 A | 10/1948 | Booth | |
| 3,141,710 A * | 7/1964 | Lehman | 384/477 |
| 3,224,821 A * | 12/1965 | Barr | 384/484 |
| 3,311,429 A * | 3/1967 | Kocian | 384/475 |
| 3,314,735 A * | 4/1967 | Kocian | 384/475 |
| 3,754,802 A | 8/1973 | Keller | |
| 3,936,102 A * | 2/1976 | Riegler et al. | 384/206 |
| 4,005,913 A | 2/1977 | Thomson, Jr. | |
| 4,129,343 A | 12/1978 | Janssen | |
| 4,249,782 A | 2/1981 | Frank | |
| 4,355,250 A | 10/1982 | Langdon | |
| 4,433,878 A | 2/1984 | Rosenthal | |
| 4,489,992 A | 12/1984 | Brandenstein et al. | |
| 4,708,499 A * | 11/1987 | Loser et al. | 384/498 |
| 4,808,013 A | 2/1989 | Waddington | |
| 5,028,151 A * | 7/1991 | Nisley | 384/477 |
| 5,121,999 A * | 6/1992 | Johnson et al. | 384/477 |
| 5,174,002 A * | 12/1992 | Kusters | 492/15 |

(Continued)

FOREIGN PATENT DOCUMENTS

| WO | 2006019347 A1 | 2/2006 |
|---|---|---|
| WO | 2006099363 A1 | 9/2006 |

*Primary Examiner* — Marcus Charles
(74) *Attorney, Agent, or Firm* — Kacvinsky Daisak PLLC

(57) ABSTRACT

A self aligning bearing and seal assembly including a bearing housing operable to mount to a surface, a bearing unit seated within the bearing housing and having an outer race, an inner race, and at least one ball intermediate the outer and inner race. The self aligning bearing and seal assembly also includes a pivot assembly having a shaft sleeve operable for receiving and maintaining a rotatable shaft and being disposed in the bearing housing and in operational contact with the inner race of the bearing unit. The pivot assembly allows for a degree of angular misalignment between the surface and the shaft greater than three degrees.

29 Claims, 8 Drawing Sheets

U.S. PATENT DOCUMENTS

| | | | |
|---|---|---|---|
| 5,381,692 A | | 1/1995 | Winslow et al. |
| 5,468,074 A | * | 11/1995 | Godec et al. ................. 384/495 |
| 5,676,468 A | | 10/1997 | Webb |
| 5,857,780 A | | 1/1999 | Newberg et al. |
| 5,954,880 A | * | 9/1999 | Aoki et al. ................... 118/423 |
| 6,117,063 A | | 9/2000 | Szepessy et al. |
| 6,152,604 A | | 11/2000 | Ostling et al. |
| 6,196,726 B1 | | 3/2001 | Newberg et al. |
| 6,482,141 B1 | * | 11/2002 | Munsche ....................... 492/47 |
| 6,939,051 B2 | | 9/2005 | Elmgren et al. |
| 6,974,258 B2 | | 12/2005 | Borcherding et al. |
| 7,090,403 B2 | * | 8/2006 | Orlowski et al. ............. 384/192 |
| 7,293,920 B2 | | 11/2007 | Arena |
| 7,510,333 B2 | * | 3/2009 | Tanner et al. ................. 384/492 |
| 7,726,661 B2 | * | 6/2010 | Orlowski et al. ............. 384/192 |
| 2007/0292065 A1 | | 12/2007 | Falk |
| 2008/0050062 A1 | | 2/2008 | Cook |

* cited by examiner

SELF ALIGNING BEARING AND SEAL ASSEMBLY

CROSS-REFERENCE TO RELATED APPLICATION(S)

The present non-provisional patent application claims priority to U.S. Provisional Patent Application Ser. No. 61/046,549, filed Apr. 21, 2008, and entitled "SELF ALIGNING BEARING AND SEAL ASSEMBLY," and is a national stage entry under 35 U.S.C. §371 of international application number PCT/US2008/077156, filed Sep. 22, 2008, and entitled "SELF ALIGNING BEARING AND SEAL ASSEMBLY," the entirety of which applications are incorporated in full by reference herein.

FIELD OF THE INVENTION

The present invention relates generally to bearing and seal assemblies, and more particularly, to self aligning bearing and seal assemblies operable for use with air cooled heat exchangers, chemical mixers and agitators, machine applications and the like where lubricated bearing assemblies are employed.

BACKGROUND OF THE INVENTION

Conventionally, self aligning bearings such as spherical roller bearings or spherical Outer Diameter (OD) bearings have been used to correct and/or address angular or radial misalignment between two bearings disposed upon a common shaft or a bearing disposed upon a fixed machine element. Conventionally, a seal is provided about a rotatable shaft such that the bearing can be mounted thereto. More specifically, the Outside Diameter (OD) of the seal is seated into a bearing housing and contacts an outer race of the bearing or housing bore while the seal Inner Diameter (ID) contacts the rotatable shaft or inner race of the bearing. Additionally, a seal may typically be provided on either side of the bearing to both contain lubricating fluid and exclude intrusive contaminates. The bearing is configured to permit slight angular movement (less than 3 degrees).

In known conventional bearings and seal assemblies there are various shortcomings. By way of example, where the seal OD is fixed in a stationary bearing housing or stationary bearing outer race, the seal ID contacts either the bearing inner race or rotatable shaft. As the bearing inner race pivots at the centerline of the bearing an eccentricity and misalignment is created between the seal ID and seal OD. This misalignment reduces the overall life of the bearing and seal assembly.

By way of another example, some known bearing and seal assemblies utilize lip type seals to maintain lubricating fluid within the bearing. Undesirably, if the shaft and seal are not precisely aligned, over contact occurs on one side of the seal and minimal or no contact occurs on the opposite side of the seal. Thus, the integrity of the seal is jeopardized either initially at installation or as a result of excess wear of the seal and shaft.

In still other bearing and seal assembly constructions, where mechanical type seals are utilized, the rotating sealing element is fixed to the rotatable shaft and the stationary sealing element is fixed in a stationary bearing housing. Again, if the seals are not precisely aligned, the seal faces will fail prematurely or will not seal at all. This again reduces the overall life of the bearing and seal assembly.

Currently, the ability of assuring seal integrity of any bearing and seal assembly is dependent upon how well the bearing and seal assemblies are installed and aligned to the rotating shaft. Known art provides various bearing and seal assemblies which permit angular misalignment of the bearing and seal assembly of not more than 3 degrees. However, if the misalignment between the bearing assembly and the rotatable shaft exceeds 3 degrees, such assemblies typically fail prematurely. Accordingly, manufacturers are looking to utilize improved bearing and seal assemblies which obviate the need to precisely align and install the assemblies. In one solution, it would be desirable to produce a self aligning bearing and seal assembly which accommodates angular misalignment greater than 3 degrees and up to 20 degrees. In such a solution, a self aligning bearing and seal assembly would be provided which includes a bearing housing, a bearing unit seated within the bearing housing and a pivot assembly operable for allowing an angular misalignment of a shaft to which the assembly is mounted that is greater than 3 degrees without negatively affecting seal and bearing alignment and integrity.

BRIEF SUMMARY OF THE INVENTION

In various exemplary embodiments, the present invention provides self aligning bearing and seal assemblies operable for use with any rotating machinery, including but not limited to: air cooled heat exchangers, chemical mixers and agitators, machine applications and the like where lubricated bearing assemblies are employed. In all exemplary embodiments, the bearing and seal assemblies of the present invention include a bearing housing defining an internal cavity, a pivot assembly unit seated within the bearing housing and having a bearing unit, housing and bearing seals, a shaft sleeve disposed within the housing and being operable for receiving and maintaining a rotatable shaft, and mounting features for mounting the bearing and seal assembly in position.

Advantageously, the present invention maintains seal and bearing alignment regardless of shaft position allowing a large degree of angular or radial misalignment (up to 20 degrees). Further, the bearing housings of the present invention are easily installed and aligned with no need of alignment or indicator tools. Still further, the present invention advantageously eliminates the need for application specific bearing/shaft diameter combination with a one design fits all approach. The present invention is also adaptable to all seal types, to any bearing type, and suitable for multiple lubrication fluids and systems. The present invention includes a configuration which mounts to all base plates with no need for adaptors. Additionally, the present invention allows for axial growth for the shaft in operation allowing for the use of a smooth shaft which does not have to be keyed. The present invention can be used in a variety of flange arrangements, and can be mounted with a shaft in a horizontal or vertical orientation.

Conventionally, it is common for two or more bearings to be mounted on a common shaft. The shaft is commonly attached rigidly to at least one of the bearings and the shaft is allowed to move axially through the other bearings allowing for thermal expansion of the shaft. In this configuration the bearing can seize to the shaft due to rust or fretting preventing free movement of the shaft. Advantageously, the present invention provides constant lubrication and environmental protection to the moving interface.

In an exemplary embodiment of the present invention, a self aligning bearing and seal assembly is provided. The self aligning bearing and seal assembly generally includes a bearing housing, a pivot assembly having a bearing unit, bearing and housing seals, and a mounting feature for mounting the assembly to a surface. In exemplary embodiments, the bearing unit is a bearing insert having an outer race ring seated within a bearing holder having a convexly curved outer envelope surface. The housing defines an internal cavity and has a concave inner envelope surface of substantially the same radius and curvature as the outer envelope surface of the bearing holder. In exemplary embodiments, the bearing holder receives and maintains the bearing unit in position.

The bearing unit is also provided with an inner race ring. The inner race ring is placed in operational contact with a shaft sleeve of the pivot assembly which is disposed within and rotatably supported by the bearing unit. In exemplary embodiments, the inner race ring is free to rotate with respect to the outer race, and the outer race ring is rigidly supported by the bearing holder. The rotational movement of the shaft, and thus inner race ring, is borne by a bearing surface defined by the interface between the inner and outer race rings. To lessen the friction between the inner and outer race rings, a plurality of balls or rollers (as in ball and roller type bearings, respectively) may be positioned there between in tracks formed in the inner and outer race rings, and/or lubricants may be introduced between the inner and outer races rings. Accordingly, in exemplary embodiments, the bearing housing may be provided with at least one lubrication port for allowing a lubricant to be injected into the bearing unit and at least one drain port operable for permitting the lubricant to drain from the bearing housing.

In exemplary embodiments, the pivot assembly also includes a shaft sleeve defining a bore and being operable to receive the rotatable shaft. The shaft is fixed to the pivot assembly via a locking collar and a locking sleeve retainer. The shaft sleeve is fitted into the inner diameter of the bearing unit thereby allowing the shaft and sleeve to rotate freely with the bearing inner race ring. In all exemplary embodiments, the pivot assembly is movably mounted within the housing. In addition the sleeve and locking mechanism ensures concentricity between the shaft and bearing, which improves both bearing and seal life.

The bearing and housing seals are disposed between the bearing holder and the shaft sleeve and between a top seal retainer and the shaft sleeve. The top seal retainer is removable to allow access to the bearing unit for installation and maintenance. The bearing and seal assembly may also include seals and/or O-rings. The seals may be located between the top seal retainer and the shaft sleeve, and is operable for keeping out dust, water, etc. The O-rings are located between the housing and the top seal retainer.

In exemplary embodiments, a snap ring may be provided and located about the shaft sleeve to help position the shaft sleeve and the bearing unit. Lubrication can be injected into one side of the bearing assembly via the lubrication port. The lubricant flows into and through the bearing unit to opposed side of the bearing unit thereby ensuring lubricant is applied to all elements of the bearing unit. The lubricant is then vented from bearing assembly through the drain port.

In another exemplary embodiment, a self aligning bearing and seal system is provided and includes a radial bearing assembly operable to mount to a first side of a surface; a radial pivot assembly comprising a first set of seals and a first bearing unit, wherein the first seal and first bearing unit are disposed to a first shaft sleeve operable to receive a rotatable shaft; a thrust bearing assembly operable to mount to a second side of a surface; a thrust pivot assembly comprising a second set of seals and a second bearing unit, wherein the second set of seals and second bearing unit are disposed to a second shaft sleeve operable to receive the shaft; wherein the radial pivot assembly is disposed within the radial bearing assembly to allow a large degree of angular misalignment between the surface and the shaft; and wherein the thrust pivot assembly is disposed within the thrust bearing assembly to allow a large degree of angular misalignment between the surface and the shaft.

Each of the first bearing unit and the second bearing unit includes corresponding outer and inner races disposed to the assembly; and a plurality of balls or rollers disposed within races, wherein the respective inner races are disposed to the shaft sleeve internal the bearing assembly. Each of the first seal and the second seal includes an upper seal disposed to the shaft sleeve and a seal adaptor; and a lower seal disposed to the shaft sleeve and the bearing holder, wherein the seal adapter is removable for installation and maintenance of the bearing units.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present invention is illustrated and described herein with reference to the various drawings, in which like reference numbers denote like system components, respectively, and in which.

DETAILED DESCRIPTION OF THE INVENTION

Figure 1:
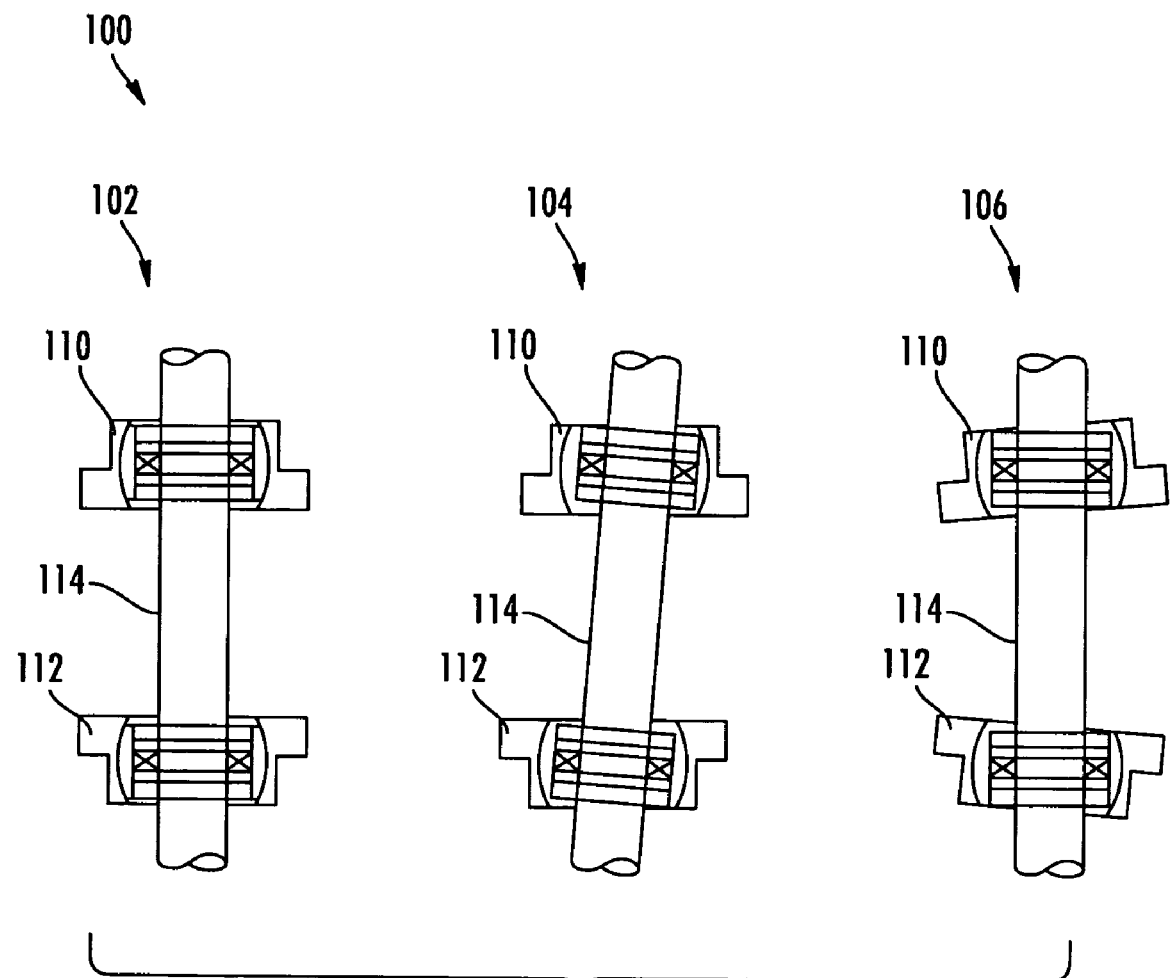
FIG. 1 is a self aligning bearing and seal assembly in an aligned configuration, in an axial misaligned configuration, and in a non-parallel surface configuration according to an exemplary embodiment of the present invention.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings. To achieve the foregoing and other objects, and in accordance with the purposes of the invention as embodied and broadly described herein, the present invention provides various embodiments of a self aligning bearing and seal assembly.

In various exemplary embodiments, the present invention provides self aligning bearing and seal assemblies operable for use with any rotating machinery, including but not limited to: air cooled heat exchangers, chemical mixers and agitators, machine applications and the like where lubricated bearing and seal assemblies are employed. In all exemplary embodiments, the bearing and seal assemblies of the present invention include a bearing housing defining an internal cavity, and a pivot assembly seated within the bearing housing and mounting features for mount the bearing and seal assembly in position. The pivot assembly includes a bearing unit, bearing holder and bearing seals located about and positioning the bearing unit, a shaft sleeve disposed within the housing and bearing unit and being operable for receiving and maintaining a rotatable shaft, and mounting features for mounting the bearing and seal assembly in position.

Advantageously, the present invention maintains bearing alignment with the shaft and seal integrity regardless of shaft position. The present invention provides for a greater degree of angular or radial misalignment/displacement of the shaft than that of conventional bearing and seal assemblies. More specifically, while conventional assemblies provide for an angular displacement of the shaft of less than 3 degrees, the present invention provides for an angular or radial misalignment/displacement up to 20 degrees. Further, via a pivot assembly disposed within the bearing and seal assembly, the rotatable shaft, the bearing unit and the bearing and housing seals remain aligned along a common axis. Still further, the bearing housings of the present invention are easily installed and aligned with no need of alignment or indicator tools. Still further, the present invention extends both seal and bearing life and minimizes environmental and safety issues. Still further, the present invention advantageously eliminates the need for application specific bearing/shaft combination with a one design fits all approach. More specifically, all sealing surfaces are controlled as part of the assembly including the shaft sleeve and accordingly are not dependent on shaft alignment and surface finish or condition. Further yet, the present invention allows for axial growth for the shaft in operation allowing for the use of a shaft which does not have to be keyed.

The exemplary embodiments of the present invention are also adaptable to a wide variety of seal types, anti-friction bearing types, and suitable for multiple lubrication fluids and re-lubrication methods. The present invention includes a universal configuration which mounts to various common size base plates with no need for adaptors. The present invention can be used in a variety of flange arrangements, and can be mounted with a shaft in a horizontal or vertical orientation.

In the exemplary embodiments described herein, any bearing type such as angular contact bearings, deep grove ball bearings, tapered roller bearings and cylindrical roller bearings can be used even when installed with a high degree of angular misalignment. Since the bearing unit is fixed within the pivot assembly, the shaft sleeve rotates simultaneously with the bearing inner race ring keeping them correctly oriented regardless of the shaft orientation relative to the bearing housing. This is accomplished by allowing the pivot assembly to move freely in the orbital socket of the bearing housing. The shaft sleeve and bearing and housing seals also orbit freely with the pivot assembly, thereby keeping the bearing, shaft and seals properly aligned ensuring seal function.

The exemplary embodiments also do not utilize a key driven bearing, but instead uses a locking collar. The locking collar firmly attaches the shaft to the shaft sleeve and bearing ID. This is beneficial because a universal bearing housing will fit all shafts of a given diameter and does not require the use of a keyed shaft. This is also beneficial because concentricity is maintained with the shaft at all times. In retrofit applications where a keyed shaft already exists this bearing configuration readily installs without regard to the location of existing keyways.

In exemplary embodiments of the present invention, a self aligning bearing and seal assembly is provided and generally includes a bearing housing defining a cavity and being operable to mount to a surface, and a pivot assembly having a bearing unit seated within, a plurality of bearing and housing seals, a shaft sleeve and retainer, and a mounting mechanism operable for mounting a rotatable shaft within the bearing housing. The seals and bearing unit are seated within the pivot assembly which in turn is operable for receiving and maintaining the rotatable shaft. The pivot assembly is disposed within the bearing housing to allow for a large degree of angular or radial misalignment or displacement of the shaft. In exemplary embodiments, the permitted angular misalignment/displacement is greater than 3 degrees and up to 20 degrees.

Referring to FIG. 1, a self aligning bearing and seal assembly system 100 is illustrated in an aligned configuration 102, in an angular misaligned configuration 104, and in a non-parallel surface configuration 106 according to various exemplary embodiments of the present invention. In the exemplary embodiments of the present invention, the self aligning bearing and seal assembly 100 includes a radial bearing and seal assembly 110, a thrust bearing and seal assembly 112, and a rotatable shaft 114 disposed within the radial and the thrust bearing and seal assemblies 110 and 112, respectively. Each of the radial and thrust bearing and seal assemblies, 110 and 112, are provided with a bearing unit (not shown) and a pivot assembly (not shown) about the shaft 114. Collectively, the radial bearing assembly 110 and the thrust bearing assembly 112 are configured to mount to opposing ends of a shaft 114. Further, the radial and thrust bearing and seal assemblies 110 and 112 cooperate together such that angular misalignment about the shaft 114 under a variety of conditions is accommodated for without affecting the operation of the assemblies 110 and 112.

More specifically, the self aligning bearing and seal assembly system 100 allows for a 3+ degree of misalignment up to 20 degrees. Disadvantageously, existing self aligning bearing and seal assemblies are limited to less than 3 degrees of misalignment to maintain seals and bearings within their design constraints. In existing self aligning bearings and existing self aligning bearing and seal assemblies, bearing $L_{10}$ rating (predicted service life) is predicated on maintaining an alignment similar to that shown in the aligned configuration 102 of the present invention. Bearing $L_{10}$ rating dramatically decreases as the angular misalignment between the shaft and bearing increases. Additionally in existing seal technology, seal integrity and seal life are dependent upon maintaining close angular alignment and run-out tolerances between the seal and the rotating shaft. In the present invention, even with an increased degree of misalignment between the rotating shaft 114 and the bearing and seal assemblies 110 and 112, bearing loads can be supported in the axial misaligned configuration 104, and the non-parallel surface configuration 106 without de-rating the bearing $L_{10}$ rating. Still further, the seal and bearing alignment and integrity is maintained even when the shaft 114 of the bearing assembly is tilted, such as in the axial misaligned configuration 104 and the non-parallel surface configuration 106.

Figure 2:
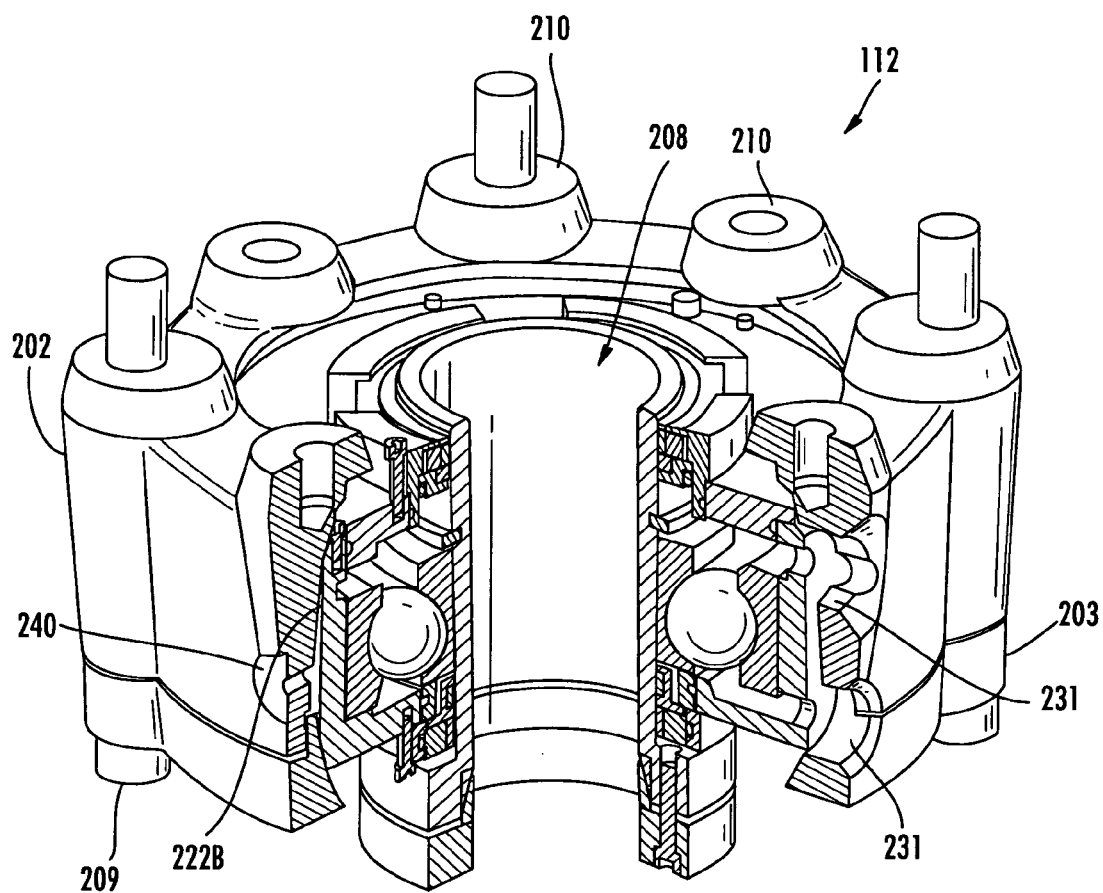
FIG. 2 is a section perspective view of a thrust bearing and seal assembly constructed according to an exemplary embodiment of the present invention.
Figure 3:
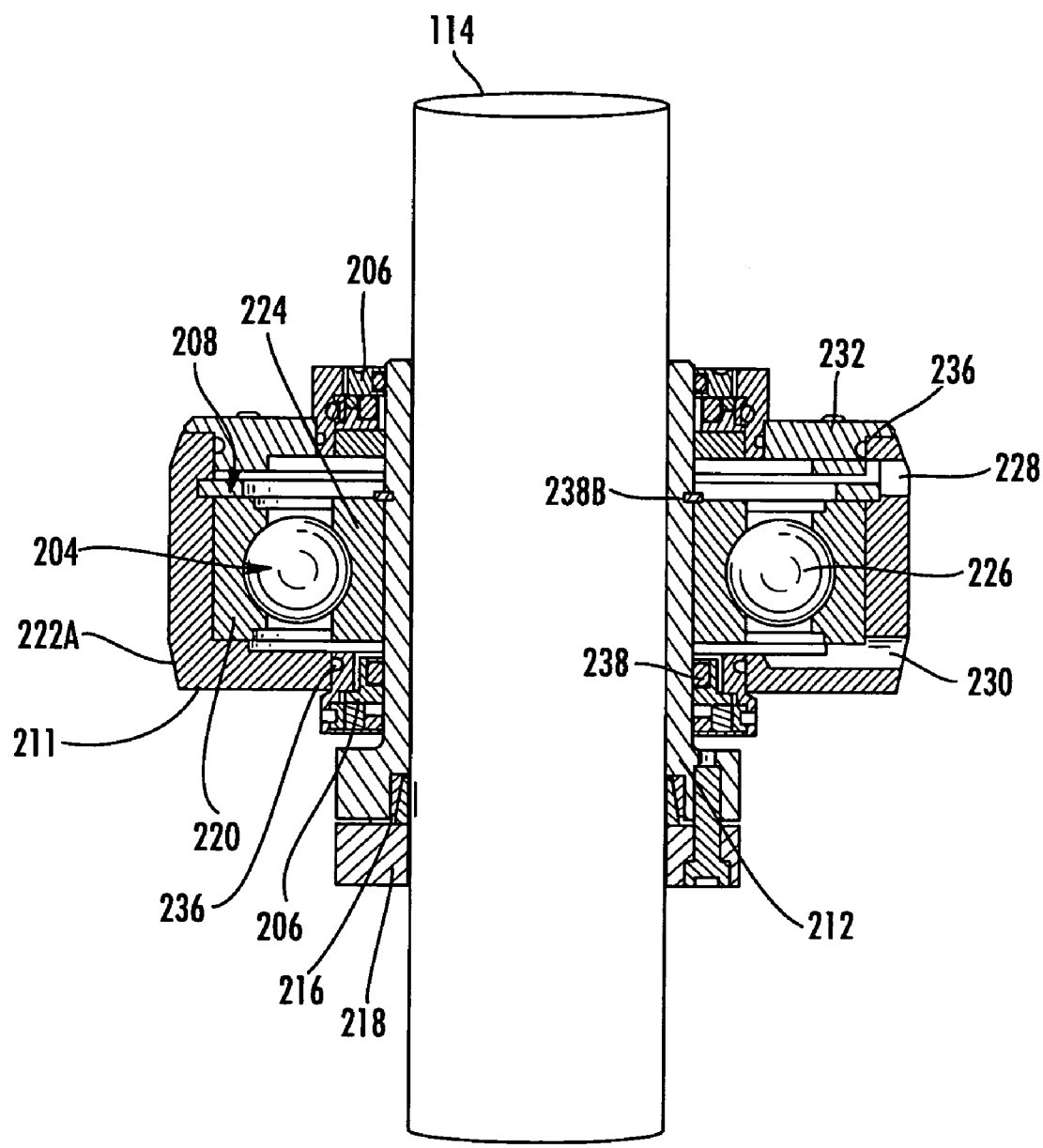
FIG. 3 is a section view of a thrust bearing pivot assembly according to the exemplary embodiment of the present invention shown in FIG. 2.
Figure 4:
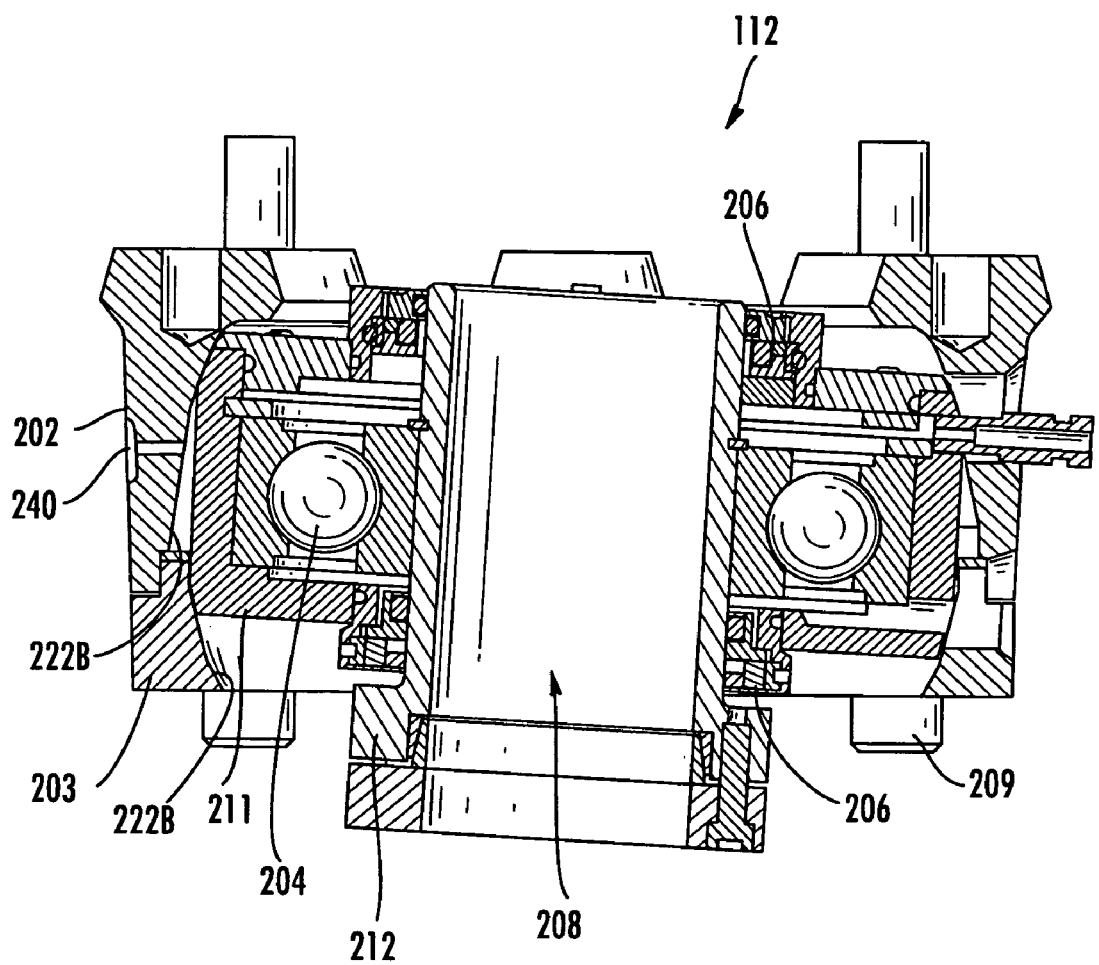
FIG. 4 is a section view of the thrust bearing and seal assembly of FIG. 2 with the pivot assembly rotated according to an exemplary embodiment of the present invention.

Referring now to FIGS. 2-4 and 5-6, a bearing and seal assembly 112 is illustrated according to an exemplary embodiment of the present invention. Specifically, FIGS. 2-4 illustrate a thrust bearing assembly. FIG. 2 illustrates the thrust bearing and seal assembly 112 which includes a bearing housing 202, a bearing retainer 203, a pivot assembly 208 and a mounting feature 210 for mounting the assembly to a surface. The bearing assembly 112 is operable to mount to a surface, via the mounting feature 210 in the housing 202. It will be understood by those skilled in the art that the mounting feature 210 may be any suitable means of mounting the assembly 112 to a surface. As illustrated, the mounting feature 210 includes a plurality of screws or bolts and screw or bolt inlets. Also, as shown, the bearing housing 202 is depicted as a flange mounted system. However, it will be appreciated by those skilled in the art that any type of suitable housing may be employed, such as, for example, a Plummer block.

In an exemplary embodiment illustrated in FIG. 3, the bearing unit 204 is disposed within the pivot assembly 208 and is a bearing insert and it generally includes an outer race ring 220 and an inner race ring 224. A bearing holder 211 is provided adjacent to the outer race ring 220 and has a convexly curved outer envelope surface 222A. Referring to FIG. 2, the bearing housing 202 and bearing retainer 203 defines an internal cavity and has a corresponding concave inner envelope surface 222B of substantially the same radius and curvature as the outer envelope surface of the bearing holder 211. The bearing unit 204, which itself cannot not permit either angular or axial displacement between bearing rings 220 and 224, constitutes the insert bearing. Due to the provision of the mating curved surfaces of the bearing holder 211 the bearing housing 202 and bearing retainer 203, the insert bearing unit 204 can align with the shaft 114 to permit angular and axial misalignment between the housings 110 and 112 of FIG. 1 such as can be caused by long shafts, thermal influence, vibration, and the like. In exemplary embodiments, the bearing holder 211 is configured to receive and maintain the bearing unit 204 in an aligned position.

The bearing unit 204 is also provided with an inner race ring 224. The inner race ring 224 is placed in operational contact with a shaft sleeve 212 disposed within the pivot assembly 208 and rotatably supported by the bearing unit 204. The rotational movement of the shaft 114 is imparted to the inner race ring 224 of the bearing unit 204. In exemplary embodiments, the inner race ring 224 is free to rotate with respect to the outer race 220, and the outer race ring 220 is rigidly supported by the bearing holder 211. The rotational movement of the shaft sleeve 212 and shaft 114, and thus inner race ring 224, is borne by a bearing surface defined by the interface between the inner and outer race rings, 220 and 224, respectively. To lessen the friction between the inner and outer race rings 220 and 224, a plurality of balls or rollers 226 (as in ball and roller type bearings, respectively) may be positioned there between in tracks formed in the inner and outer race rings 220 and 224, and/or lubricants may be introduced between the inner and outer race rings 220 and 224. Accordingly, in exemplary embodiments, the bearing holder 211 may be provided with at least one lubrication port 228 for allowing a lubricant to be injected into the bearing unit 204 and at least one drain port 230 operable for permitting the lubricant to drain from the bearing housing 202. Lubrication can be injected into one side of the bearing assembly 112 via the port 228. The lubricant flows into and through the bearing unit 204 to opposed side of the bearing unit 204 thereby ensuring lubricant is applied to all elements of the bearing unit 204. The lubricant is then vented from the pivot assembly 208 through the drain port 230. Accordingly, portals 231 are provided in the bearing retainer 203 and bearing housing 202 to provide access to the lubrication inlet port 228 and the lubricant drain port 230 once the pivot assembly 208 is installed in the thrust bearing assembly 112.

As illustrated, the bearing unit 204 is a ball bearing with a locking ring. It will be understood by those skilled in the art that while the bearing unit disclosed herein is a ball bearing unit, any anti-friction bearing unit may be used, including but not limited to angular contact bearings, deep grove ball bearings, tapered roller bearings, cylindrical roller bearings, ball bearings, self aligning ball bearings, spherical roller bearings, toroidal roller bearings, thrust bearings, cylindrical roller thrust bearings, spherical roller thrust bearings, needle bearings, sleeve bearings, plain bearings, journal bearings, double row bearings, duplex bearings and the like.

In exemplary embodiments, the shaft sleeve 212 defines a bore and is operable to receive the rotatable shaft 114. The shaft 114 is fixed to the shaft sleeve 212 of the pivot assembly 208 via a locking collar 216 and a locking sleeve retainer 218. The shaft sleeve 212 is fitted into the inner diameter of the bearing unit 204 thereby allowing the shaft 114 and sleeve 212 to rotate freely with the bearing inner race ring 224. In all exemplary embodiments, the pivot assembly 208 is movably mounted within the housing 202. During installation, the pivot assembly 208 is allowed to freely orbit inside the bearing and seal assembly 112 (i.e., along the curved interior surface 222) to ensure that the bearing unit 204 and seals 206 are precisely aligned with the shaft. Once shaft orientation is established, the pivot assembly 208 is secured in place by tightening bolts 209 which closes the curved interior surfaces 222A and 222B between the bearing housing 202 and the bearing retainer 203 and bearing holder 211 to capture the bearing holder 211. Advantageously, no tools are required for positioning the bearing unit 204.

The bearing and housing seals 206 are disposed between the bearing holder 211 and the shaft sleeve 212 and between a seal retainer 232 and the shaft sleeve 212. The seal retainer 232 is removable to allow access to the bearing unit 204 for installation and maintenance. The pivot assembly 208 may also include an O-ring seal 236 or gasket of other means to seal the interface between the bearing holder 211 and the seal retainer 232. The O-ring seals 236 are located between the bearing holder 211 and the top seal retainer 232.

In exemplary embodiments, at least one snap ring 238B may be provided and located about the shaft sleeve 212 to position the bearing unit 204. In addition, at least one snap ring 238 may be provided to retain bearing unit 204 in bearing holder 211. In still other embodiments, an accelerometer and/or thermocouple mounting pad 240 is provided with the housing 202 for attachment of such devices.

Referring to FIG. 4, a section view of the thrust bearing and seal assembly 112 is illustrated with the pivot assembly 208 rotated according to an exemplary embodiment of the present invention. As shown, the bearing unit 204 and seals 206 maintain alignment and integrity even when the shaft and the shaft sleeve 212 are displaced/tilted. More specifically, the shaft sleeve 212 bearing unit 204, and seals 206 remain precisely aligned along a common axis. The pivot assembly 208 is configured to rotate within the thrust bearing and seal assembly 112 with the bearing holder 211 being disposed to the interior curved surface 222B in the bearing housing 202 and the bearing retainer 203. The entire pivot assembly 208 rotates including the shaft sleeve 212, the bearing 204, and the seals 206. Further, when used in a thrust load application, the pivot assembly 208 can be rotated to allow the thrust load to be applied axially to the bearing unit 204 from either direction.

The present invention eliminates a need for application specific bearing/shaft combinations, i.e. the present invention uses no snap rings to position the shaft 114. Accordingly, one design fits all applications. The present invention aligns the bearing unit 204 to the shaft sleeve 212 and the shaft 114. and provides a controlled sealing surface for the seals 206. All rotating sealing surfaces are controlled as part of the shaft sleeve 212, they are not dependent on shaft 114 alignment and finish. Thus, a ground shaft finish is not required.

The present invention is adaptable to all seal types and to all bearing types. The present invention is suitable for multiple lubrication mediums or lubrication methods, such as, grease, oil, oil mist, and the like. A single configuration of the self aligning bearing and seal assembly can mount to all base plates with no need for adaptors. Multiple mounting patterns are integrated into single machining. The present invention allows for axial growth for the shaft in applications, and allows for use of a smooth bore shaft and does not have to be keyed. The self aligning bearing and seal assembly 112 can be inserted into a variety of flange arrangements, such as flanged, Plummer block, etc., and can be mounted with the shaft 114 in a horizontal or vertical orientation.

The shaft attachment maintains concentric alignment between the shaft 114 and the pivot assembly 208 (e.g., through the use of the locking shaft retainer rather than set screws or other means of attachment) which allows a use of smooth shaft and requires no machining of shaft. Additionally, the self aligning bearing and seal assembly is reconfigurable to allow for thrust load in either direction, and the orbital element can be flipped over.

Figure 5:
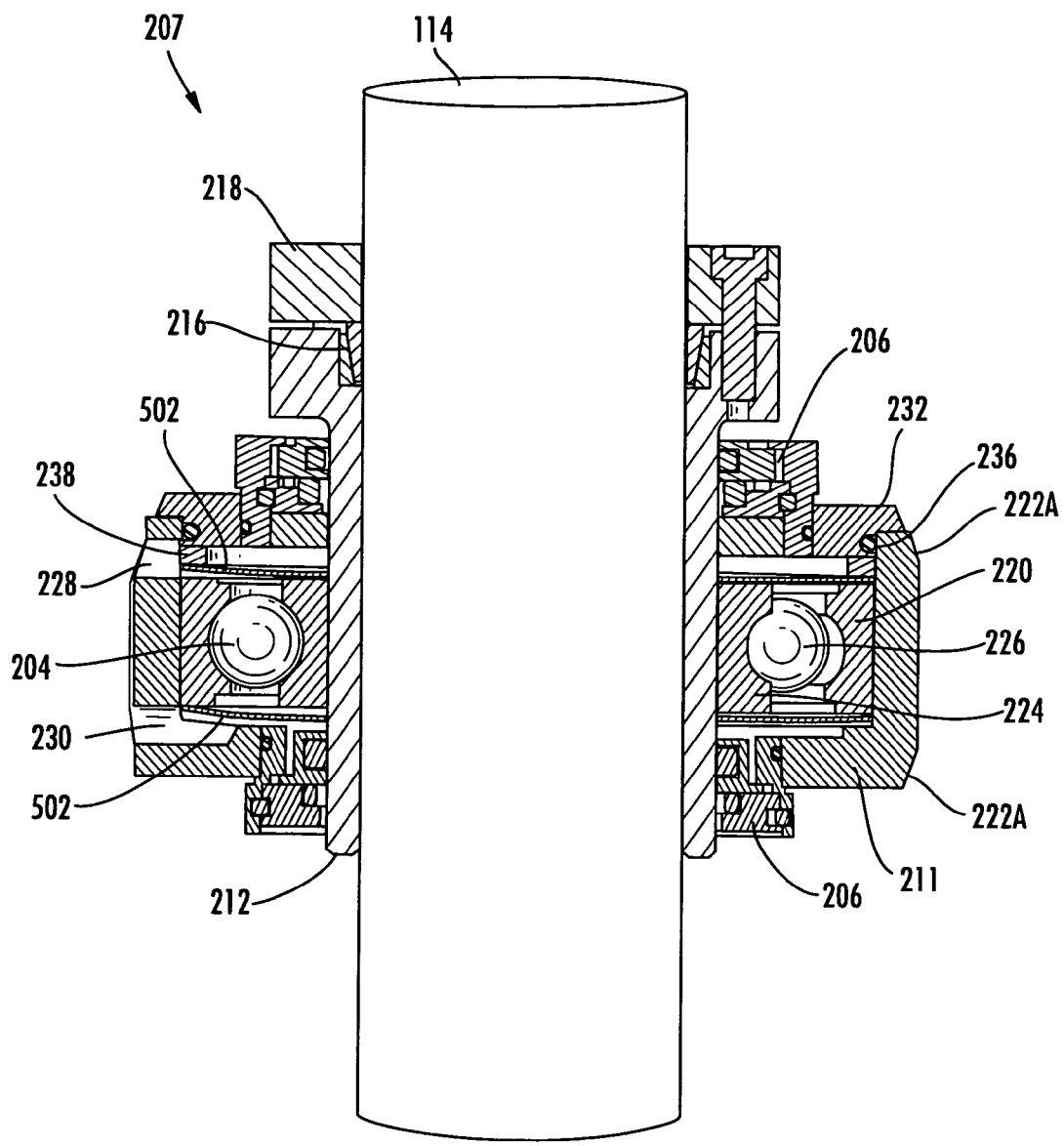
FIG. 5 is a section view of a radial pivot assembly constructed according to an exemplary embodiment of the present invention.
Figure 6:
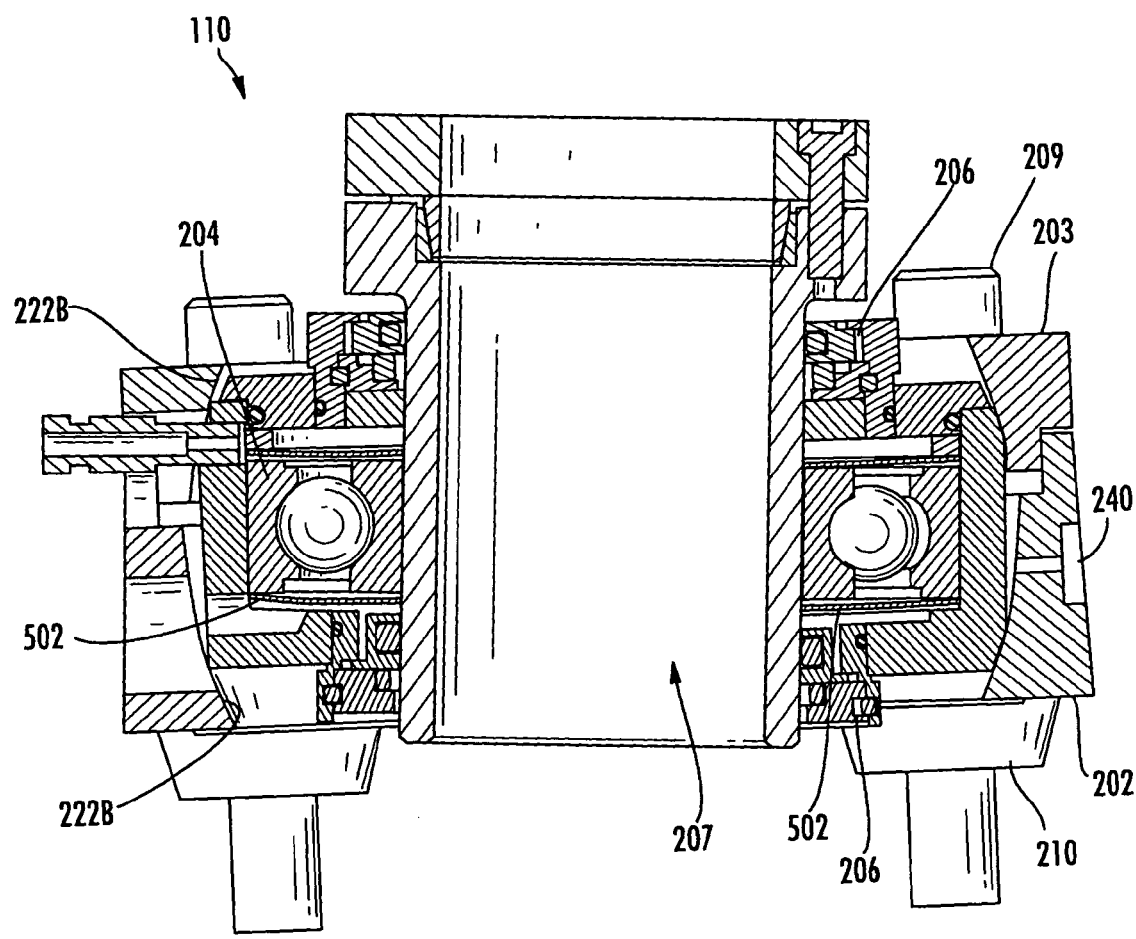
FIG. 6 is a section view of the radial bearing and seal assembly with the pivot assembly of FIG. 5 rotated according to an exemplary embodiment of the present invention.

Referring now to FIGS. 5-6, a radial bearing and seal assembly 110 is illustrated according to an exemplary embodiment of the present invention. The radial bearing and seal assembly 110 includes a bearing housing 202, a bearing retainer 203, a mounting feature 210 for mounting the assembly to a surface and a pivot assembly 207 having a bearing unit 204 and bearing housing seals 206. The radial bearing and seal assembly 110 is of a similar construction to that of the thrust bearing assembly 112 and pivot assembly 208 shown in FIGS. 2-4. Accordingly, like reference numerals describe like elements and functions. In exemplary embodiments, wave washers 502 are provided within the pivot assembly 207 and about the bearing unit 204 to allow axial movement of the bearing unit 204 within the bearing holder 211 due to thermal expansion and contraction of the shaft 114. Advantageously, by using the wave washers 502 excess overloading is prevented.

Referring specifically to FIG. 5-6, a section view of the radial bearing and seal assembly 110 is illustrated with the pivot assembly 207 rotated according to an exemplary embodiment of the present invention. As shown, the bearing unit 204 and seals 206 maintain alignment and integrity even when the shaft and the shaft sleeve 212 are displaced/tilted. More specifically, the shaft sleeve 212 bearing unit 204, and seals 206 remain precisely aligned along a common axis. The pivot assembly 207 is configured to mount within the radial bearing and seal assembly 110 with the bearing holder 211 being disposed to the interior curved surface 222B in the bearing housing 202 and the bearing retainer 203. The entire pivot assembly 207 orbits including the shaft sleeve 212, the bearing 204, and the seals 206.

Figure 7:
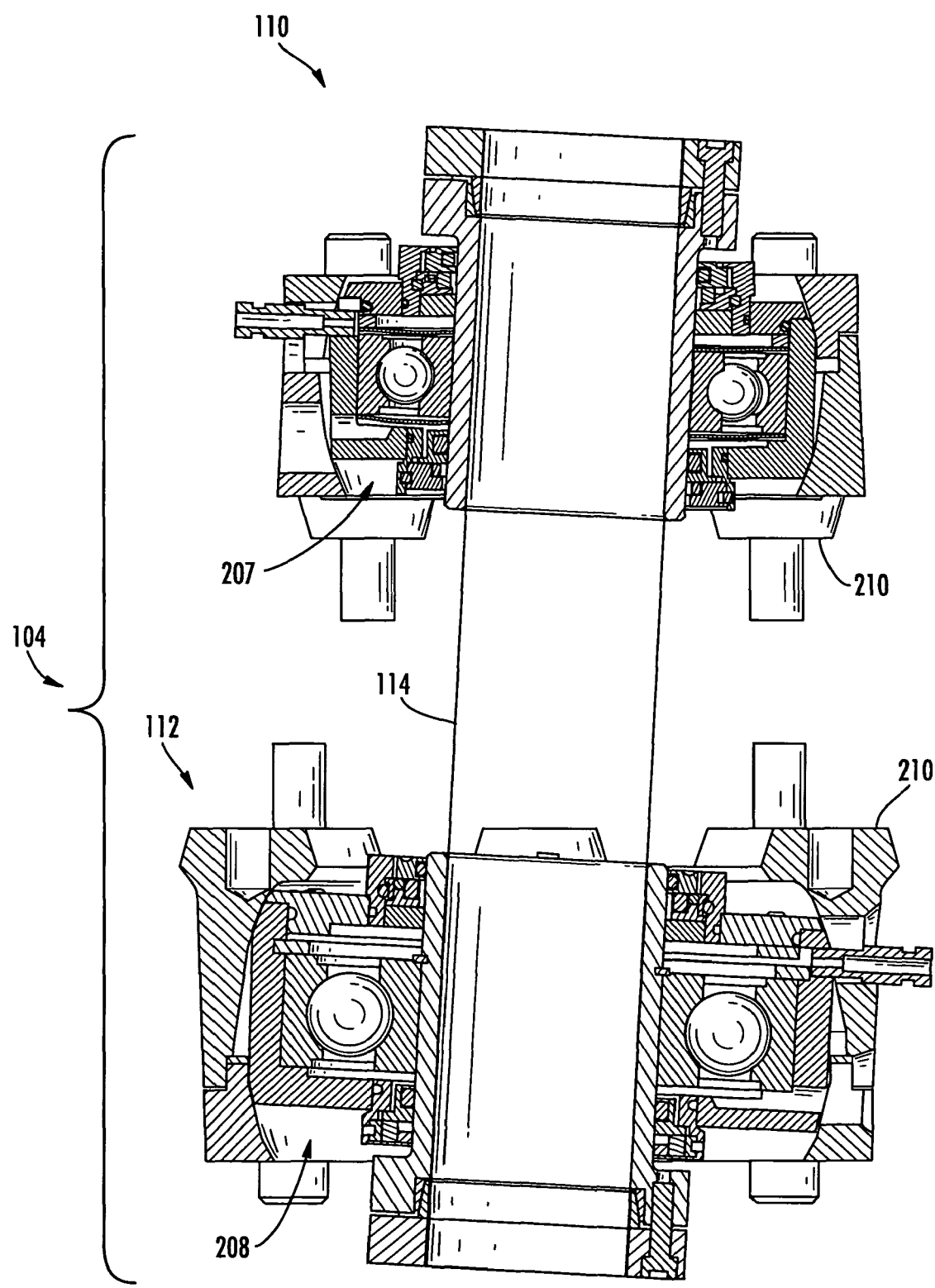
FIG. 7 is a section view of a self aligning bearing and seal assembly system including the thrust bearing assembly of FIG. 4 and a radial bearing assembly of FIG. 6 with an axial misalignment according to an exemplary embodiment of the present invention.

Referring to FIG. 7, a section view is illustrated of a self aligning bearing and seal assembly system 100 of FIG. 1 including the radial bearing and seal assembly 110 and a thrust bearing and seal assembly 112 with an axial misaligned configuration 104 according to an exemplary embodiment of the present invention. FIG. 7 illustrates a section view of both the radial bearing and seal assembly 110 and the thrust bearing and seal assembly 112 with a shaft 114 extending through each assembly 110 and 112.

In FIG. 7, the shaft 114 is shown misaligned within the self aligning bearing and seal assembly system 100 of FIG. 1. Here, the radial bearing and seal assembly 110 and the thrust bearing and seal assembly 112 are shown with the mounting features 210 of 110 and 112 in a substantially horizontal position, and the shaft 114 is tilted off of a vertical position relative to the substantially horizontal plane. Each of the radial bearing and seal assembly 110 and the thrust bearing and seal assembly 112 are secured to a surface (not shown), and the thrust and radial pivot assemblies 207 and 208 respectively each are configured to maintain seal and bearing alignment despite the misalignment of the shaft 114.

Figure 8:
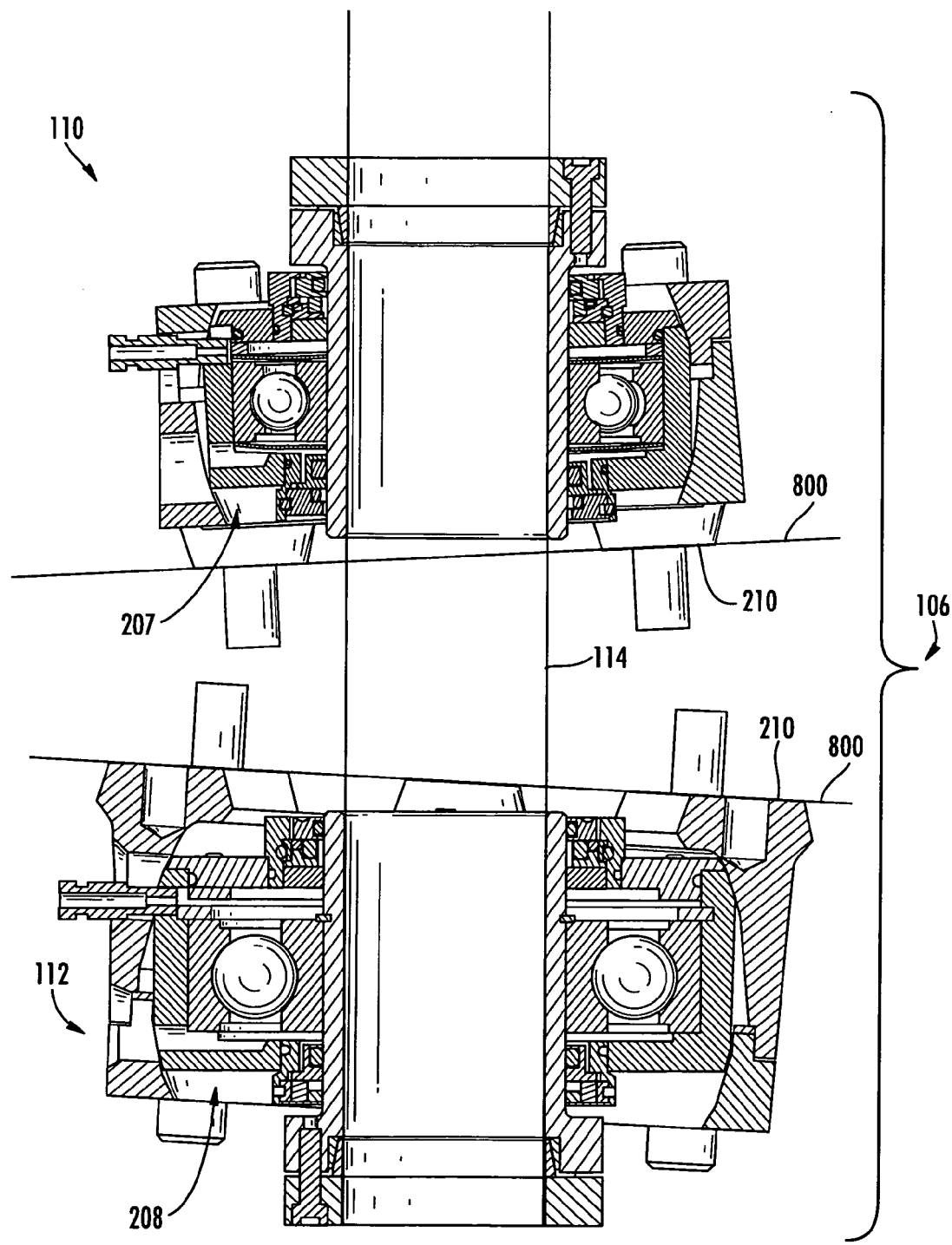
FIG. 8 is a section view of the self aligning bearing and seal assembly system of FIG. 7 attached to a non-parallel surface according to an exemplary embodiment of the present invention.

Referring to FIG. 8, a section view is illustrated of the self aligning bearing and seal assembly system 100 of FIG. 1 including a radial bearing and seal assembly 110 and a thrust bearing and seal assembly 112 where the mounting features 210 of 110 and 112 are attached to non-parallel surface 800 in a non-parallel surface configuration 106 according to an exemplary embodiment of the present invention.

Here, the radial bearing and seal assembly 110 and the thrust bearing and seal assembly 112 are shown at an angled position (relative to horizontal) due to the non-parallel surface 800, and the shaft 114 is in a substantially vertical position. Each of the radial bearing and seal assembly 110 and the thrust bearing and seal assembly 112 are secured to the non-parallel surfaces, and the top and bottom pivot assemblies 207, 208 each are configured to maintain seal and bearing alignment despite the misalignment of the shaft 114 due to the non-parallel surface 800.

It is to be understood that both the foregoing description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A self aligning bearing and seal assembly, comprising: a bearing housing defining an internal cavity and being operable to mount to a surface; a pivot assembly having a bearing holder operable for receiving and maintaining a rotatable shaft, the pivot assembly being disposed in the bearing housing; a bearing unit disposed within the pivot assembly being in operational contact with the pivot assembly; and
a plurality of bearing and housing seals located about the bearing unit,
wherein the pivot assembly maintains the alignment and integrity of the bearing unit, the bearing and housing seals, and the shaft up to 20 degrees of displacement between the surface and the rotatable shaft; and
wherein the pivot assembly is lockable to the bearing housing to prevent relative movement during operation.

2. The self aligning bearing and seal assembly of claim 1, wherein the pivot assembly is comprised of an outer race, an inner race, and at least one ball intermediate the outer race and inner race.

3. The self aligning bearing and seal assembly of claim 1, wherein the pivot assembly further comprises a locking sleeve shaft retainer operable to retain the rotatable shaft in position.

4. The self aligning and bearing assembly of claim 3, wherein the locking sleeve shaft retainer allows the shaft to comprise a smooth shaft and requires no machining of the shaft.

5. The self aligning and bearing assembly of claim 1, further comprising: a lubrication inlet disposed into the pivot assembly; and a lubrication outlet disposed into the pivot assembly, wherein lubricant is injected via the lubrication inlet, and wherein the lubricant is vented from the lubrication outlet.

6. The self aligning and bearing assembly of claim 1, wherein the bearing housing forms an interior surface on which the seat of the pivot assembly is configured to rotate to support degree of displacement between the surface and the shaft.

7. The self aligning and bearing assembly of claim 6, wherein the interior surface is curved.

8. The self aligning and bearing assembly of claim 1, wherein the self aligning and bearing assembly is configured to mount with the rotatable shaft in a horizontal or vertical orientation.

9. The self aligning and bearing assembly of claim 1, wherein the self aligning and bearing assembly is reconfigurable to allow for thrust load in any direction.

10. The self aligning and bearing assembly of claim 1, wherein the bearing unit is selected from the group consisting of angular contact bearings, deep grove ball bearings, tapered roller bearings, cylindrical roller bearings, ball bearings, self aligning ball bearings, spherical roller bearings, toroidal roller bearings, thrust bearings, cylindrical roller thrust bearings, spherical roller thrust bearings, needle bearings, sleeve bearings, plain bearings, and journal bearings.

11. The self aligning bearing and seal assembly of claim 1, further comprising an accelerometer port disposed within the housing.

12. The self aligning bearing and seal assembly of claim 1, further comprising an thermocoupler port disposed within the housing.

13. The self aligning bearing and seal assembly of claim 1, further comprising at least one wave washer disposed within the pivot assembly and about the bearing unit to maintain the bearing unit in position and to reposition the bearing unit as required.

14. A self aligning bearing and seal assembly, comprising:
a bearing housing defining an internal cavity;
a pivot assembly defining a seat and having a shaft sleeve operable for receiving and maintaining a rotatable shaft and a bearing unit, the pivot assembly being disposed in the bearing housing; and
a plurality of bearing and housing seals located about the bearing unit,
wherein the pivot assembly maintains the alignment and integrity of the bearing unit, the bearing and housing seals, and the shaft up to 20 degrees of displacement between the surface and the rotatable shaft; and
wherein the pivot assembly is lockable to the bearing housing to prevent relative movement during operation.

15. The self aligning bearing and seal assembly of claim 14, wherein the bearing unit is disposed within the pivot assembly and includes an outer race, an inner race, and at least one ball intermediate the outer and inner race, the inner race being in operational contact with the shaft sleeve of the pivot assembly.

16. The self aligning and bearing assembly of claim 15, further comprising a bearing holder provided adjacent the outer race ring of the bearing unit.

17. The self aligning bearing and seal assembly of claim 14, wherein the pivot assembly further comprises a locking sleeve shaft retainer operable to retain the rotatable shaft in position.

18. The self aligning and bearing assembly of claim 14, further comprising: a lubrication inlet disposed into the pivot assembly; and a lubrication outlet disposed into the pivot assembly, wherein lubricant is injected via the lubrication inlet, and wherein the lubricant is vented from the lubrication outlet.

19. The self aligning and bearing assembly of claim 14, wherein the bearing housing forms an interior surface on which the seat of the pivot assembly is configured to rotate to support degree of displacement between the surface and the shaft.

20. The self aligning and bearing assembly of claim 19, wherein the interior surface is curved.

21. The self aligning and bearing assembly of claim 14, wherein the self aligning and bearing assembly is configured to mount with the rotatable shaft in a horizontal or vertical orientation.

22. The self aligning and bearing assembly of claim 14, wherein the bearing unit is selected from the group consisting of angular contact bearings, deep grove ball bearings, tapered roller bearings, cylindrical roller bearings, ball bearings, self aligning ball bearings, spherical roller bearings, toroidal roller bearings, thrust bearings, cylindrical roller thrust bearings, spherical roller thrust bearings, needle bearings, sleeve bearings, plain bearings, and journal bearings.

23. The self aligning bearing and seal assembly of claim 14, further comprising at least one wave washer disposed within the pivot assembly and about the bearing unit to maintain the bearing unit in position and to reposition the bearing unit if required.

24. The self aligning bearing and seal assembly of claim 23, wherein the at least one wave washer allows axial movement of the bearing unit due to thermal expansion or contraction of the shaft.

25. The self aligning bearing and seal assembly of claim 23, wherein the at least one wave washer prevents excess overloading of the assembly.

26. The self aligning and bearing assembly of claim 16, further comprising: a lubrication inlet disposed into the pivot assembly for allowing a lubricant to be injected into the pivot assembly; a lubrication outlet disposed into the pivot assembly for allowing the lubricant to be vented from the pivot assembly; at least one wave washer disposed within the pivot assembly and about the bearing unit to maintain the bearing unit in position and to reposition the bearing unit if required; wherein the at least one wave washer allows axial movement of the bearing unit along a sliding surface located between the bearing unit and the bearing holder, and wherein the sliding surface is completely contained within a lubricated portion of the pivot assembly so as to be protected from environmental contamination.

27. A self aligning bearing and seal system, comprising:
a radial bearing assembly operable to mount to a first side of a surface;
a radial pivot assembly disposed within the radial bearing assembly and comprising a first seal and a first bearing unit, wherein the first seal and first bearing unit are disposed to a first sleeve operable to receive a rotatable shaft;
a thrust bearing assembly operable to mount to a second side of a surface; and
a thrust pivot assembly disposed within the thrust bearing assembly and comprising a second seal and a second bearing unit,
wherein the second seal and second bearing are disposed to a second sleeve operable to receive the rotatable shaft;
wherein the radial bearing assembly and the thrust bearing assembly cooperate to allow misalignment between respective surfaces of the assemblies and the rotatable shaft up to 20 degrees; and
wherein the radial pivot assembly is lockable to the radial bearing assembly to prevent relative movement during operation.

28. The self aligning bearing and seal system according to claim 27, wherein the misalignment is caused by nonaligned bearing housings.

29. The self aligning bearing and seal system according to claim 27, wherein the misalignment is caused by nonparallel bearing housing mounting surfaces.

* * * * *